US009547908B1

(12) United States Patent
Kim et al.

(10) Patent No.: US 9,547,908 B1
(45) Date of Patent: Jan. 17, 2017

(54) FEATURE MASK DETERMINATION FOR IMAGES

(71) Applicant: Google Inc., Mountain View, CA (US)

(72) Inventors: Eunyoung Kim, Mountain View, CA (US); Ronald Frank Wotzlaw, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/868,332

(22) Filed: Sep. 28, 2015

(51) Int. Cl.
G06K 9/34 (2006.01)
G06T 7/00 (2006.01)
G06T 7/40 (2006.01)
G06T 3/40 (2006.01)
G06T 5/20 (2006.01)
G06K 9/00 (2006.01)

(52) U.S. Cl.
CPC ......... *G06T 7/0081* (2013.01); *G06K 9/00228* (2013.01); *G06T 3/40* (2013.01); *G06T 5/20* (2013.01); *G06T 7/408* (2013.01); *G06T 2207/10024* (2013.01); *G06T 2207/20028* (2013.01)

(58) Field of Classification Search
USPC . 382/164, 162, 203, 289, 296; 1/1; 345/592, 629; 600/200; 725/32
See application file for complete search history.

(56) References Cited

U.S. PATENT DOCUMENTS

| 4,203,671 A | 5/1980 | Akimoto |
| 6,263,113 B1 | 7/2001 | Abdel-Mottaleb et al. |
| 6,282,317 B1 * | 8/2001 | Luo ..................... G06K 9/00234 382/203 |
| 6,690,822 B1 | 2/2004 | Chen |
| 7,215,828 B2 * | 5/2007 | Luo ..................... G06K 9/00664 382/289 |
| 7,587,083 B2 | 9/2009 | Kishiba |
| 7,916,905 B2 | 3/2011 | Quach |
| 8,218,862 B2 | 7/2012 | Demirli |

(Continued)

FOREIGN PATENT DOCUMENTS

CN 1975762 A 6/2007

OTHER PUBLICATIONS

USPTO, Final Office Action for related U.S. Appl. No. 14/200,000, Aug. 5, 2015, 13 pages.

(Continued)

*Primary Examiner* — Anh Do
(74) *Attorney, Agent, or Firm* — IP Spring

(57) ABSTRACT

Implementations relate to feature mask determination for images. In some implementations, a computer-implemented method to determine a feature mask for an image includes estimating one or more prior regions in the image that define a feature in the image. The method determines superpixels based on multiple pixels of the image similar in color. The method constructs a graph, each node of the graph corresponding to a superpixel, and determines a superpixel score for each superpixel based on a number of pixels of the superpixel. The method determines one or more segmented regions in the image based on applying a graph cut technique to the graph based at least on the superpixel scores, and determines the feature mask based on the segmented regions. The feature mask indicates a degree to which pixels of the image depict the feature. The method modifies the image based on the feature mask.

20 Claims, 9 Drawing Sheets

(56) References Cited

U.S. PATENT DOCUMENTS

| | | |
|---|---|---|
| 8,295,557 B2 | 10/2012 | Wang |
| 8,311,355 B2 | 11/2012 | Brunner |
| 8,345,114 B2 | 1/2013 | Ciuc et al. |
| 8,385,609 B2 | 2/2013 | Piramuthu |
| 8,406,482 B1 | 3/2013 | Chien et al. |
| 8,638,993 B2 | 1/2014 | Lee et al. |
| 8,644,600 B2 * | 2/2014 | Yang ............... G06K 9/621 345/592 |
| 8,698,796 B2 | 4/2014 | Mochizuki |
| 8,983,152 B2 | 3/2015 | Lewis et al. |
| 9,189,886 B2 * | 11/2015 | Black ............... G06K 9/00369 |
| 2007/0110305 A1 | 5/2007 | Corcoran |
| 2009/0041297 A1 | 2/2009 | Zhang |
| 2011/0299776 A1 | 12/2011 | Lee et al. |
| 2013/0044947 A1 | 2/2013 | Brandl |
| 2013/0077823 A1 | 3/2013 | Mestha |
| 2013/0329995 A1 | 12/2013 | Webb et al. |

OTHER PUBLICATIONS

USPTO, Non-Final Office Action for Related U.S. Appl. No. 14/200,000, Apr. 16, 2015, 27 pages.
European Patent Office (EPO), International Search Report for International Patent Application No. PCT/US2014/037934, Feb. 10, 2014, 4 pages.
International Bureau of WIPO, International Preliminary Report on Patentability for International Patent Application No. PCT/US2014/037934, Nov. 17, 2015, 8 pages.
Jones, M. et al., "Statistical Color Models with Application to Skin Detection", International Journal of Computer Vision, vol. 46, Jan. 1, 2002, pp. 81-96.
Kim, et al., "A Nonparametric Statistical Method for Image Segmentation Using Information Theory and Curve Evolution", IEEE Transactions on Image Processing, vol. 14, No. 10, Oct. 2005, pp. 1486-1502.
Long, et al., "Fully Convolutional Networks for Semantic Segmentation", Cornell Univ. Library, arXiv:1411.4038v2, Mar. 8, 2015, 10 pages
Saeed, et al., "Combining Edge Detection and Region Segmentation for Lip Contour Extraction", AMDO'10 Proceedings of the 6th international conference on Articulated Motion and Deformable Objects, 2010, 10 pages.
USPTO, Notice of Allowance for U.S. Appl. No. 14/200,000, Oct. 15, 2015, 10 pages.
USPTO, Notice of Allowance for U.S. Appl. No. 13/894,384, Nov. 12, 2014, 7 pages.
Xiaofeng, Ren, "Superpixels, Empirical Studies and Applications", http://www.cs.washington.edu/homes/xren/research/superpixel/, accessed Jun. 30, 2011, pp. 1-3.
SIPO, Office Action (with English translation) for Chinese Patent Application No. 201480035737.5, Oct. 17, 2016, 6 pages.

* cited by examiner

FEATURE MASK DETERMINATION FOR IMAGES

BACKGROUND

The popularity and convenience of digital cameras as well as the widespread of use of Internet communications have caused user-produced images such as photographs to become ubiquitous. For example, users of Internet platforms and services such as email, forums, photograph repositories, and network services post images for themselves and others to view. Images can be posted by users to a network service for private viewing (e.g., friends or other small groups of users) and/or public viewing by many users. Images can be edited by users in various ways, e.g., using image editing programs to manually edit images.

SUMMARY

Implementations generally relate to feature mask determination for images. In some implementations, a computer-implemented method to determine a feature mask for an image includes estimating one or more prior regions in the image, where the one or more prior regions approximately define the feature in the image. The method determines a plurality of superpixels, where each superpixel is based on multiple pixels of the image that are similar in color. The method constructs a graph, where each node of the graph corresponds to a superpixel of the plurality of superpixels, and determines a superpixel score associated with each of the superpixels, where the superpixel score is based at least on a number of pixels from which the superpixel is determined. The method determines one or more segmented regions in the image based on applying a graph cut technique to the graph based at least on the superpixel scores, and determines the feature mask based on the one or more segmented regions. The feature mask indicates a degree to which each of a plurality of pixels of the image depict the feature. The method modifies the image based on the feature mask.

Various implementations and examples of the method are described. For example, the method can further include downsampling the image before determining the one or more segmented regions. The method can further include upsampling the feature mask to an original pixel resolution of the image before modifying the image. The graph nodes can be connected to each other by edges in the graph, and the method can further include determining a respective edge score associated with each edge in the graph, where each edge score is based at least in part on a number of adjacencies of pixels between superpixels connected by the edge. Each superpixel can have a color that is an average of the colors of the pixels from which the superpixel is determined, and each edge score can be based on a color difference between the superpixels connected by the associated edge, where the color difference is weighted by the number of adjacencies of pixels between the connected superpixels. In some examples, determining the superpixel score associated with each superpixel includes determining a respective likelihood between a color of each pixel of the superpixel and a color model determined for the feature, and summing the likelihoods.

The one or more segmented regions can be one or more binary mask regions indicating that corresponding pixels of the image are feature pixels, and the method can further include determining confidence mask regions for the feature mask based on the one or more binary mask regions using a joint bilateral filter, where each confidence mask pixel can indicate the degree to which at least one corresponding pixel of the image depicts the feature using confidence values from a continuous range of values. The method can further include determining a plurality of color models including at least one foreground color model and at least one background color model based on the one or more prior regions, where determining a superpixel score can include determining a foreground score indicating association of the associated superpixel to a foreground region based on the foreground color model, and determining a background score indicating association of the associated superpixel to a background region based on the background color model.

The one or more prior regions can be a plurality of prior regions, where each of the prior regions can define a different portion of the feature in the image, and a respective color model can be determined for each different portion. The feature can include a human body, and the one or more prior regions can be a plurality of prior regions including a head prior region and a torso prior region, where estimating the head prior region can include determining a head feature portion based on detecting a face in the image, and estimating the torso prior region can be based on a location of the head feature portion and an orientation of the head feature portion. In some implementations, estimating the torso prior region can include estimating a width of the torso prior region based on a pan angle of the detected face.

In some implementations, a system to determine a mask for at least a portion of a human body depicted in an image includes a storage device and at least one processor operative to access the storage device and configured to estimate a head prior region in the image, where the head prior region defines a head feature portion in the image. The processor is configured to estimate a torso prior region in the image based on a location of the head feature portion and at least one orientation of the head feature portion, and determine one or more segmented regions based on the head prior region and the torso prior region. The processor is configured to determine a human body mask based on the one or more segmented regions, where the human body mask indicates a degree to which each of a plurality of pixels of the image depict the at least a portion of the human body. The processor is configured to modify one or more pixels in the image using the human body mask.

Various implementations and examples of the system are described. For example, the processor can be further configured to determine a plurality of color models that include at least one foreground color model and at least one background color model based on the head prior region and the torso prior region, where the processor can be configured to determine the one or more segmented regions by determining a foreground association of the plurality of pixels to a foreground region based on the foreground color model, and determining a background association of the plurality of pixels to a background region based on the background color model.

The processor can be configured to determine the segmented regions by determining a plurality of superpixels, where each superpixel is based on multiple pixels of the image that are similar in color, determining a superpixel score associated with each superpixel based on a number of pixels in the superpixel, and applying a graph cut technique utilizing the superpixels as nodes for a graph used by the graph cut technique. The processor can be configured to estimate the head prior region by determining the head feature portion based on detecting a face in the image, and estimate the torso prior region based on a pan angle of the detected face and/or a roll angle of the detected face.

In some implementations, a non-transitory computer readable medium having stored thereon software instructions to determine a mask for an image that, when executed by a processor, cause the processor to perform operations. The operations include estimating a plurality of prior regions in the image, where each of the plurality of prior regions defines a portion of the feature in the image. The operations include determining a plurality of color models including a foreground color model and a background color model respectively based on an associated one of the prior regions. The operations include determining one or more segmented regions in the image including determining a foreground association of a plurality of pixels to a foreground region based on the associated foreground color model, and determining a background association of the plurality of pixels to a background region based on the associated background color model. The operations include determining a feature mask based on the one or more segmented regions, where the feature mask indicates a degree to which each of a plurality of pixels of the image depict the feature, and modifying one or more pixels in the image using the feature mask.

Various implementations and examples of the computer readable medium are described. For example, the portions of the feature can include a head portion and a torso portion, and the operation of estimating a plurality of prior regions can include estimating a head prior region and a torso prior region, where estimating the torso prior region is based at least in part on a location of the head portion and an orientation of the head portion. Determining the one or more segmented regions can include determining a plurality of superpixels, each superpixel based on multiple pixels of the image that are similar in color, determining a superpixel score associated with each superpixel based on a number of pixels in the superpixel, determining a graph including the superpixels as nodes and including a plurality of edges connecting the superpixels, where each edge is associated with a respective edge score based on a number of adjacencies of pixels between superpixels connected by the edge, and applying a graph cut technique that partitions the graph based on the superpixel scores and the edge scores. The operations can further include downsampling the image before the operation of determining the one or more segmented regions, and upsampling the feature mask to an original pixel resolution of the image before modifying one or more pixels in the image. The operation of determining the one or more segmented regions can include determining each pixel of the image as a feature pixel or a non-feature pixel based on the association with the foreground region and the association with the background region, and applying a joint bilateral filter to the mask based on color similarity of corresponding image pixels to obtain the feature mask, wherein each mask pixel of the feature mask is indicative of a confidence level that a corresponding pixel of the image depicts the feature.

DETAILED DESCRIPTION

Figure 1:
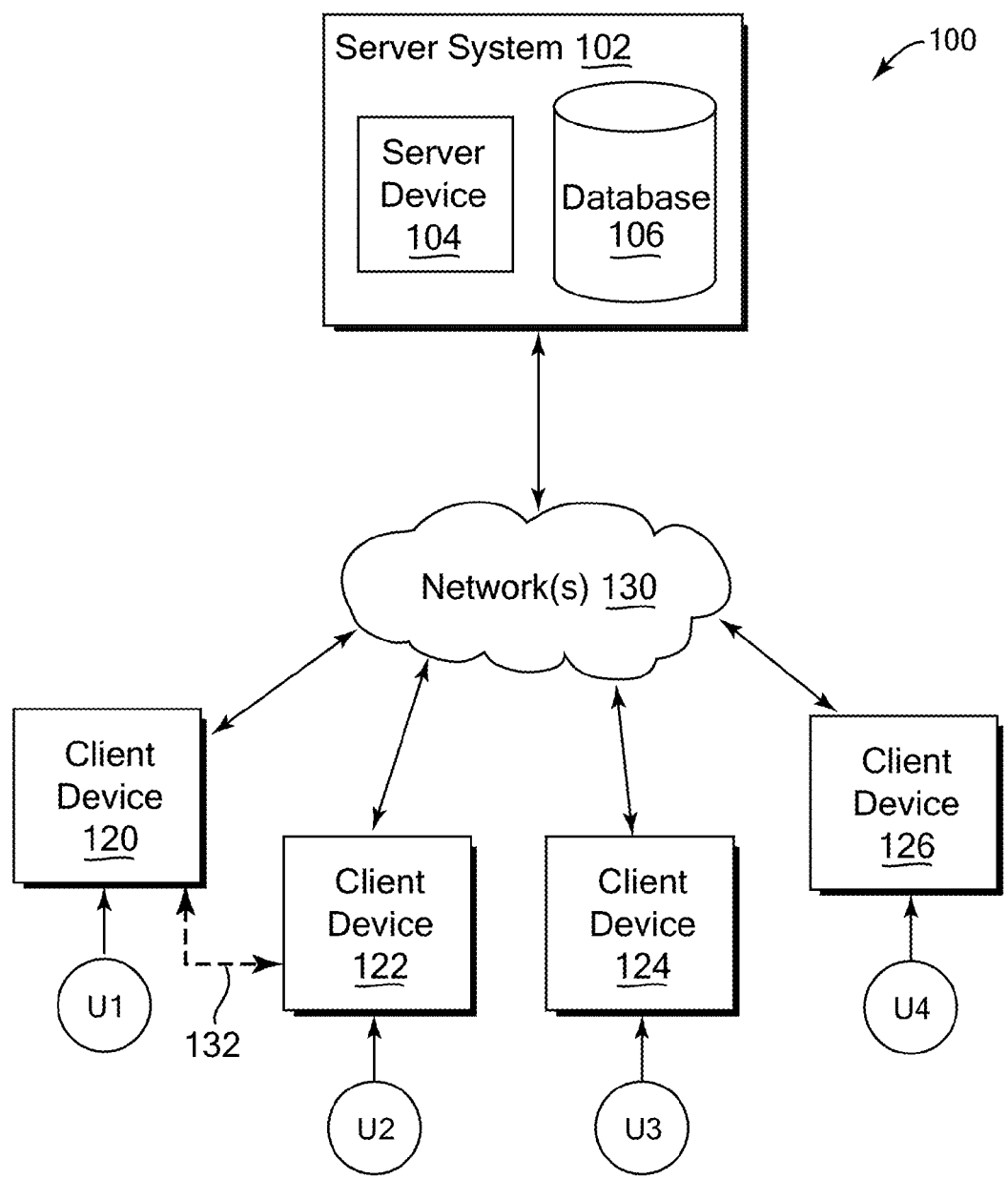
FIG. 1 is a block diagram of an example network environment which may be used for one or more implementations described herein.

One or more implementations described herein relate to feature mask determination for images. Some example systems can obtain an image depicting one or more detected features. For example, the feature can be a human body having feature portions including a head feature portion and a torso feature portion, or can be a different type of features and feature portions. In some implementations, a feature mask can be determined by estimating prior regions in the image based on one or more detectable features (e.g., a face), and segmenting foreground and background regions based on the estimated prior regions. In some implementations, segmented foreground regions are provided as feature regions for the feature mask that indicate features of the image.

For example, in some implementations, a color model can be determined for foreground and background regions for each estimated feature portion, e.g., for a head region and for a torso region, based on estimated prior regions. Some implementations can determine a plurality of superpixels that are each based on multiple pixels of the image. For example, the superpixels can be provided as nodes in a graph data structure and can be connected by edges in the graph. Superpixel scores can be determined for the superpixels based at least on a number of pixels from which the superpixel is determined, as well as based on an appropriate determined color model. Edge scores can also be determined for the edges based at least on the number of adjacencies of pixels between superpixels connected by the edges. A segmentation technique such as a graph cut technique can be used to determined segmented regions in the image based on the superpixel scores and/or edge scores. The segmented regions can be determined as foreground regions and background regions used to determined the feature mask.

In some implementations the segmented regions provide a binary mask, and a confidence mask can be determined from the binary mask by determining confidence mask regions for the feature mask based on the binary mask regions, e.g., using a joint bilateral filter. Each confidence mask pixel can indicate the degree to which at least one corresponding pixel of the image depicts the feature, using confidence values from a continuous range of values. Using the feature mask, image modifications can be applied to the pixels of the image. For example, the modifications (e.g., performed by one or more edit operations to an image) can change color values of one or more pixels of a feature, and/or can change values of pixels of the image not included in a feature.

Various described features can allow a system to determine a feature mask that indicates the degree to which pixels of an image depict a particular feature, e.g., a body feature or other feature. For example, described features can provide accurate indication of which pixels in an image are feature pixels, allowing accurate application of image modifications to feature areas and/or to non-feature areas of an image.

Described features can allow desired feature pixels of an image to be automatically, quickly, and accurately indicated using a determined feature mask. For example, various features described herein can determine a feature mask based on detectable image features and landmarks, such as a face and facial landmarks, allowing accurate detection and determination of feature pixels such as head pixels. Some feature portions can be detected quickly and accurately based on other detectable features, such as body torso regions determined based on characteristics of detected face and/or head regions. Separate regions can be estimated in the image to determine separate color models for use in more accurately segmenting regions in the image. For example, the use of separate head and torso prior regions can allow building of more robust color models which can allow more accurate image segmentation for the mask. In addition, the entire image need not be analyzed to determine color models when using described features, since only detected regions such as faces need be used to estimate prior regions for use in determining the color models.

Furthermore, described features allow foreground regions indicating feature regions of the image to be quickly and accurately segmented from background regions using segmentation techniques such as graph cut techniques. Processing such as downsampling of the image and determining superpixels for use with a graph cut technique can reduce processing inputs and increase the speed of determining the mask while maintaining its quality.

A system using one or more features described herein can provide accurate and quality results. The system can reduce user time and effort by automatically applying modifications to image pixels based on the feature or non-feature status of the pixels, and by avoiding tedious manual editing of images to apply desired modifications to image features such as faces. Furthermore, described features can reduce the processing resources needed for storage and editing of images that may otherwise need to be performed manually.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

An "image" as referred to herein can be a still image, single image, or standalone image, or can be an image included in a series of images, e.g., a frame in a video sequence of video frames, or an image in a different type of sequence of images. For example, implementations described herein can be used with single images or with one or more images from one or more series or video sequences of images.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image editing program and/or an image display program. The image editing program may allow a system (e.g., client device or server system) to provide options for editing and displaying an image and/or a mask image, some examples of which are described herein. The image editing program can provide an associated user interface that is displayed on a display device associated with the server system or client device. The user interface may provide various options to a user to select images and editing options, editing modes, display modes, etc. for one or more images.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
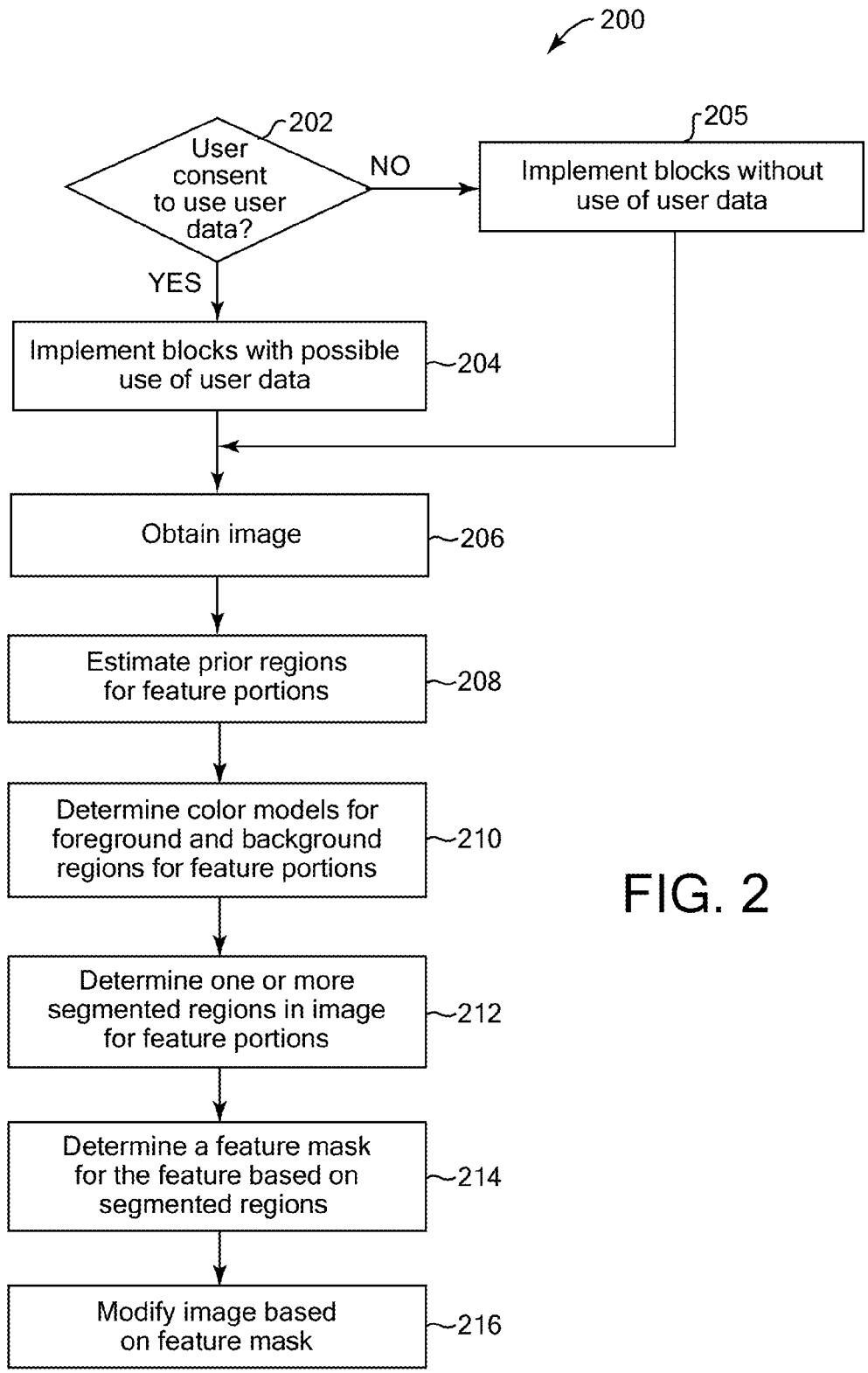
FIG. 2 is a flow diagram illustrating an example method to determine a mask for a feature depicted in an image, according to some implementations.

FIG. 2 is a flow diagram illustrating one example of a method 200 to determine a mask for a feature depicted in an image. The mask can be determined for a desired image feature depicted in an image, or multiple desired features in some implementations. For example, method 200 and examples herein can refer to a human body feature, which can be an image feature (e.g., object or area) in the image which depicts a human body or portion(s) thereof, e.g., a torso and a head of a person, an entire body of a person, etc. The mask can be determined for other image features in other implementations, e.g., portion or part of an animal, landscape feature, object, monument, etc.

In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input in a user interface or other input device or interface.

In some implementations, the method 200, or portions of the method, can be initiated automatically by a system. For example, the method (or portions thereof) can be periodically performed, or performed based on one or more particular events or conditions, e.g., an application being opened by a user, receiving one or more images that have been newly uploaded to or accessible by the system, a predetermined time period having expired since the last performance of method 200, and/or one or more other conditions occurring which can be specified in settings of a system. In some implementations, such conditions can be previously specified by a user in stored custom preferences of the user (accessible with user consent). In one example, a server system can receive one or more input images uploaded from one or more users, and can perform the method 200 for the newly-uploaded images. In another example, a system (server or client) can perform the method 200 for a large collection of accessible images, e.g., a user's collection of images (if user consent is received). In another example, a camera, cell phone, tablet computer, wearable device, or other client device can capture an image and can perform the method 200. In addition or alternatively, a client device can send one or more captured images to a server over a network, and the server can process the images using method 200.

In block 202, it is checked whether user consent (e.g., user permission) has been obtained to use user data in the implementation of method 200. For example, user data can include user preferences, information about a user's social network and contacts, user characteristics (identity, name, age, gender, profession, etc.), social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 206. If user consent has not been obtained, it is determined in block 205 that blocks are to be implemented without use of user data, and the method continues to block 206. In some implementations, if user consent has not been obtained, the remainder of method 200 is not performed.

In block 206 of method 200, the an image is obtained for processing. The image can be a digital image composed of multiple pixels, for example, and can be stored on one or more storage devices of the system or otherwise accessible to the system, e.g., a connected storage device such as a local storage device, storage device connected to or in communication with a network accessible to the system, etc. For example, the image can be a photo captured by a camera, an image frame extracted from a captured video stream or other video data, or an image derived from a different source.

In some implementations, a user can provide, select, or designate one or more images to obtain for processing. In some implementations, the image can be automatically obtained by the method, e.g., as an image from a stored collection of multiple images, e.g., from a user's album, a pool of stored images submitted by users, etc. Automatic obtaining of an image from a user's collection is performed with the user's consent as indicated in block 204, e.g., via stored user preferences accessed by block 206. The collections can be locally stored and accessible by the system performing method 200, and/or can be remotely stored on a server or client device, e.g., as one or more albums provided in account(s) of user(s) of a network service. In some implementations, the system can determine which image to select based on evaluating one or more characteristics of accessible images, e.g., timestamps and other metadata of images, the color distributions of images, the recognized content or labels describing content in images, user data such as user preferences, etc. (accessed with user consent).

For example, in some implementations, a system can automatically (e.g., without human intervention) select a particular image for processing. For example, such selection may be determined (with user consent) based on user data, including stored user preferences, a user history of previous modifications made by the user to other images, social data indicating user preferences (e.g., previous comments, ratings, etc. made by the user), recent or upcoming events based on the user's stored calendar or planner, locations visited or to be visited by the user (e.g. as detected by GPS sensors on a device carried by the user), activities of the user (e.g., sensed or inferred by locations visited by the user), etc.

In block 208, one or more prior regions are estimated for portions of the desired image feature that is to be provided with a feature mask. The prior regions are estimated regions that are based on one or more characteristics of the image. For example, if the desired feature is a human body, then the image can be examined for one or more faces (with consent from users) and a detected face in the image can be used to determine an estimated head prior region. In some implementations, if the desired feature is a particular type of object or effect in the image, then one or more image recognition techniques suitable for detecting such a feature, or portions of the feature, can be performed on the image to detect the desired feature portions.

Some implementations can provide multiple prior regions for each feature portion. For example, for a body feature, a head portion of the body can be assigned a base prior region that is assumed to include mostly head pixels, a potential foreground region that may include head pixels and has a border between the head portion and non-head pixels, and a potential background region that may include non-head (e.g., background) pixels. Similarly, a torso portion of the body can be assigned a base prior region that is assumed to include mostly torso pixels, a potential foreground region, and a potential background region. Some example implementations of estimating prior regions for feature portions are described below with reference to FIG. 3.

In block 210, color models may be determined for a foreground region and background region for each of the feature portions for which prior regions were estimated in block 208. For example, a foreground region can be the base prior region combined with the potential foreground region for a particular feature portion, and the background region can be the potential background region for the particular feature portion, as estimated in block 208. In some examples, color models can be determined based on clustering colors of pixels based on similarity and/or spatial distance between pixels in the image. In some implementations, each color model can be a model of a probability distribution of colors in the region associated with the color model (e.g., the foreground region or background region). For example, one or more color models can be Gaussian Mixture Models (GMMs) determined based on the associated estimated prior regions. The Gaussian Mixture Model can indicate the probability (or score) that any particular pixel in the image (or in a particular area of the image) is in the region associated with that Gaussian Mixture Model (e.g., foreground region or background region of a particular feature portion). Other implementations can use or determine other pixel color distributions or types of color models, such as a histogram of the pixel counts at different color values.

For example, a foreground color model (e.g., Gaussian Mixture Model) can be determined for the foreground region of a head portion of a body based on the pixel colors of the base prior region and the potential foreground region estimated for the head portion. After the color model is determined, given a particular pixel of the image, the color of that pixel can be looked up in the foreground color model to determine a probability or score that the particular pixel is in the head foreground region, e.g., is a feature pixel that is part of the head portion. Similarly, a background color model (e.g., Gaussian Mixture Model) can be determined for the background region of the head portion based on the pixel colors of the potential background region of the head portion. Given a particular pixel of the image, the pixel's color can be looked up in the determined background color model to determine a probability or score that the particular pixel is in the background region, e.g., is a non-feature pixel that is part of a non-head area of the image, such as a background area of the image.

In some implementations, Gaussian Mixture Models (or other types of color models) of similar types for different segmented regions of the image can be combined. In one example, a head GMM for a head portion is associated with a foreground or feature region, and a different GMM for another body portion (e.g., torso, arms, etc.) is also associated with a foreground region. The head GMM for the head portion can be combined with the other GMM for the other body portion to be used as a combined foreground GMM for both head and other body portions.

The processing of block 210 (and/or the other blocks and methods described herein) can be performed using any of a variety of different color spaces, e.g., RGB (red-green-blue), HSV (hue-saturation-value), HSL (hue-saturation-lightness), YCbCr, etc.

In block 212, one or more segmented regions are determined in the image for the feature portions. For example, the segmented regions can be determined based on the color models determined in block 210, and can include one or more foreground (feature) regions and background regions. In some implementations, determining the segmented regions can include determining a foreground association of pixels to a foreground region based on an associated foreground color model, and determining a background association of the pixels to a background region based on the associated background color model. For example, the pixel associations to foreground and background regions can be indicated by scores. In some implementations, the segmented regions can be determined based on one or more segmenting techniques. In some examples, a graph cut technique can be used to determine the segmented regions based on color and location of pixels in the image, where the score of pixels can be based on the color of the pixels as referenced to an appropriate color model determined in block 210. Some implementations can include various features in determining the segmented regions, including determining superpixels to use in the graph cut technique. Some example implementations of determining segmented regions using a graph cut technique and other features are described below with reference to FIG. 4.

In block 214, a feature mask is determined based on the one or more segmented regions. The feature mask indicates a degree to which each of a plurality of pixels of the image depict the feature. For example, segmented regions determined as foreground regions can indicate feature pixels that indicate the desired image feature, and segmented regions determined as background regions can indicate non-feature pixels. In some implementations, a segmented region determined for one image feature (or one portion of an image feature) can be combined with one or more other segmented regions determined for other image features (or portions of an image feature) into a single feature mask, e.g., by providing the multiple segmented regions in a single mask image corresponding to the original image. In some implementations, the feature mask can be a confidence mask provided with confidence values at pixel positions from a continuous range of values, and based on binary segmented regions determined in block 212. Some example implementations of determining a feature mask based on the segmented regions are described below with reference to FIG. 5.

In block 216, the image is modified based on the feature mask of block 214. Various implementations can perform a variety of different modifications. For example, pixel values (e.g., color values) of the feature in the image can be modified based on the feature mask. Feature mask pixels may each correspond to one or more image pixels, and the feature mask pixels can indicate the degree (or strength) to which the modification is to applied to the corresponding image pixels. For example, modifications can be applied to the color values of the feature in the image using one or more edit operations (e.g., applying one or more filters, etc.). In some implementations, the feature mask can be provided and used as a binary mask, e.g., where each pixel of the mask indicates whether or not the associated pixel of the input image depicts the desired image feature (e.g., the degree to which the corresponding pixel depicts the feature is 0% or 100% and no other values). The feature mask can allow a system to determine which pixels of the image should be modified. For example, in feature masks providing a range of confidence values for mask pixels, confidence values (or probabilities) in the mask that are above a threshold value can be considered to indicate that the associated pixels are feature pixels, and confidences below the threshold confidence can be considered to indicate that the associated pixels are non-feature pixels. In some examples, a feature mask for a human body can indicate feature pixels for portions of the body and non-feature pixels for pixels outside the human body, e.g., in a background of the image.

In some examples, any of various modifications can be applied to pixels of the image. For example, blurring, contrast adjustment (e.g., applying local contrast), brightness adjustment, saturation adjustment, luminance adjustment, etc. can be applied. In some implementations or cases, the modifications can be applied only to the feature pixels of the image using the feature mask and not to non-feature pixels. For example, if the feature is a human body, modifications can be applied to pixels of the human body as indicated by the feature mask. In some examples, the modifications can include a blurring or smoothing of the body pixels, or applying color changes to simulate a body paint effect. Some implementations can, for example, copy and paste a portion of a different image (or a video sequence) into a region of the image defined by the feature in the feature mask, such as a human body feature.

Some implementations or cases can apply one or more of the modifications to non-feature pixels of the image using the feature mask. For example, if the feature is a human body, modifications can be applied to background pixels or other pixel areas of the image outside the human body masked by the feature mask. In one example, the background surrounding the human body can be modified with filters and/or a superimposed image, video sequence, etc. to give the appearance that the human body is located in a different background setting in the image than the background setting depicted in the original image. Some implementations can apply one or more of the modifications differently (e.g., at different magnitudes or other parameters) to feature pixels and to non-feature pixels.

In some implementations, multiple features can be detected in the image obtained in block 206. If multiple such features are detected, the blocks of method 200 can be performed for each detected feature, in some implementations. For example, multiple faces or human bodies may be detected in the image and a feature mask can be determined for each detected face or body or for a subset of the detected faces or bodies. In some implementations, the same or different modifications can be applied to the image using different feature masks. For example, one type or magnitude of image modification can be applied to one human body in the image using one feature mask determined for that human body, and a different type or magnitude of modification can be applied to a different human body in the image using a different feature mask determined for that body. Some implementations can include multiple features (e.g., for multiple human bodies) in a single feature mask of block 214. For example, some implementations can combine feature regions or foreground regions from multiple masks into a single mask.

In various implementations, the modified image resulting from block 216 can be stored on one or more accessible storage devices. The modified image can be caused to be otherwise output by a system, e.g., displayed on a display screen, transmitted to another system via a communications network, etc.

Figure 3:
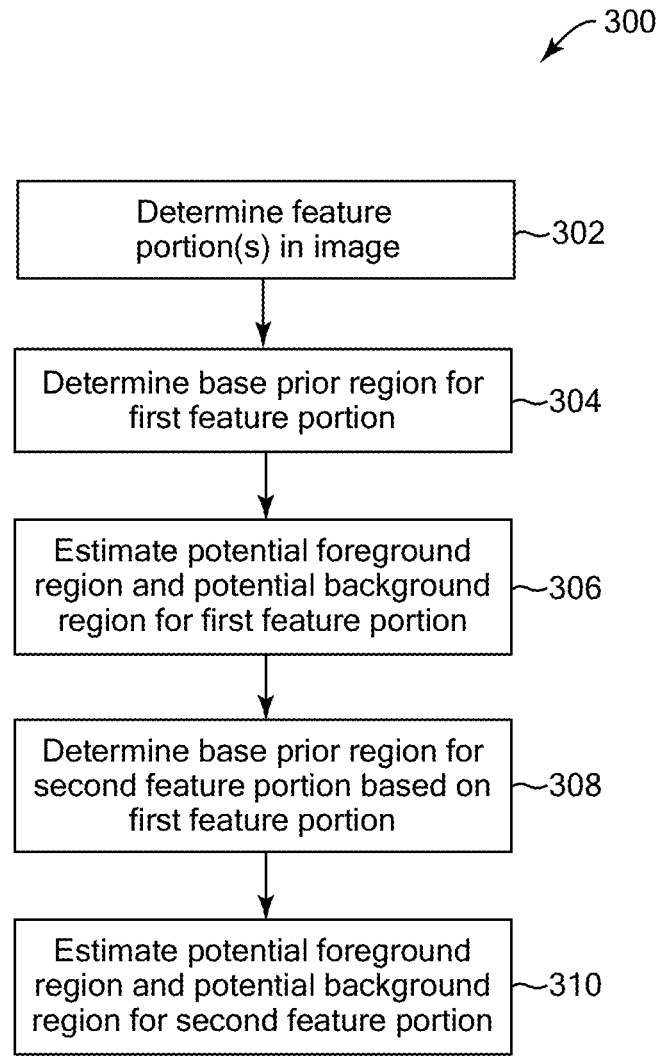
FIG. 3 is a flow diagram illustrating an example method to estimate one or more prior regions for a feature in an image, according to some implementations.

FIG. 3 is a flow diagram illustrating an example method 300 to estimate one or more prior regions for a feature in an image, e.g., for block 208 of FIG. 2. Other methods can alternatively be used for block 208.

In block 302, one or more feature portions are determined in the image of a desired feature for which a feature mask is to be determined. In some examples, the desired feature can be a human body feature (e.g., object or area) in the image which depicts a human body or a portion of a body, e.g., a portion of a head or face, a torso, one or more body parts, etc. Other types of features can be determined and processed in other implementations. The feature portion is a portion of the desired feature, such as a head, torso, arms, legs, or other body parts as portions of a body feature.

In some examples, a feature can be determined by being detected in the image, e.g., identified or recognized, and can be one of multiple features detected in the image. For example, a feature and/or portions of the feature can be detected based on one or more image recognition techniques. In various implementations, method 300 can perform the image recognition techniques and/or send the obtained image to a recognizer implemented on the system or a connected system, and receive recognition results from the recognizer.

In various implementations, a feature portion in the image can be detected directly or can be determined indirectly by finding a detectable feature of the feature portion in the image. In some examples, a detected body feature can include a head portion having a detectable feature that is a face. The head portion can be detected by detecting the face, where the face can be detected using one or more facial recognition techniques. For example, some facial recognition techniques can examine the image to find facial landmarks such as eyes, eyebrows, nose, and mouth to detect a face in an image. In various implementations, facial recognition techniques can examine an image for facial landmarks having a particular position, profile, and/or spatial relationship with each other and/or with other identifiable features (such as other head features, body features, etc.), examine and compare image portions to general reference pattern images, and/or perform other techniques to detect faces in images. The facial recognition techniques can detect a face in an image without determining the identity of the person who is depicted. For example, general facial features in the image can be detected to determine the position of a general face, without determining a person identity, characteristics, or other user data associated with the face. For example, if no user consent was obtained from the user(s) whose face(s) are detected, this general facial detection can be used.

Some facial recognizers can provide face location data such as coordinates of a face region, e.g., a face polygon (or other shape) surrounding a detected face portion, where the polygon has segments approximately bordering a detected face based on identified facial landmarks. In some implementations, facial information besides face location data can be determined. For example, the facial recognition techniques can provide points or other locations of the facial landmarks found in the face for the facial identification process. For example, spatial coordinates of points on one or more of the facial landmarks can be provided, such as the mid-point of each eye, points indicating the spatial extent of the eye (e.g., left and right endpoints of the eyes, centered top and bottom points of the eyes, etc.), points indicating the spatial extent of the mouth, a mid-point, bottom point, and left/right points of the nose, a center point of a chin, etc.

In some implementations, information can be determined and provided indicating one or more determined angles of orientation of the face or head. For example, a roll angle of the face can indicate an amount that the head/face is rotated around an axis extending perpendicularly to the plane of the image, e.g., based on determining a tilt of one or more facial features (e.g., eyes). A pan angle can indicate an angle of orientation of the head/face around an axis extending through the long direction of the head (top of head to chin). For example, this can indicate an amount that the face is angled from a direction directly facing the plane of the image or looking to a specified side or direction. The pan angle of a face can be estimated, for example, based on locations of the facial landmarks with respect to each other and to other facial features. A yaw angle of the face can indicate an amount that the head/face is rotated around an axis extending through the short side of the face (parallel to an axis between the ears), and can be estimated, for example, based on locations of the facial landmarks with respect to each other and to other facial features.

Some implementations may determine an identity and/or other characteristics of a person (e.g., user) associated with a detected face, if user consent was obtained from the user whose identity is determined. In some implementations, user consent data associated with an identified user is consulted to determine whether the method 300 has permission to perform the processing of the method on the detected face. Access to personal information including user characteristics such as age, gender, identity, etc., is restricted based on users' control and preferences governing such information. Identities and other user characteristics are not determined for faces (or other depicted features of persons) for which such permission is not received. In some implementations, if user consent is obtained, characteristic information can be provided about the associated person whose face was identified, such as estimated age, gender, and other characteristics of the person. In some implementations, such information can be used in determining whether to process the image. In some examples, a facial recognition technique can identify a face and recognize the identity of the person being depicted based on permissibly-obtained user data and/or data from a social networking service or other network service, data service, or storage, and from the identity the system may be able to determine age, gender, and/or other user characteristics that can be used in assisting feature detection. In some other examples, such characteristic information can be determined without determining the identity of the depicted person.

In some implementations, the feature portion determined in block 302 can be a feature portion other than a head with a face. For example, a torso portion of a body can be determined. One or more other feature portions of a human body can be detected, e.g., body appendage portions including arms, legs, hands, feet, etc. Some techniques can examine the image for a full human body, or a portion of a human body, based on known patterns and/or orientations of various body appendages, e.g., based on a skeleton model or other model. Some techniques can determine a user identity or other identity of a detected body feature, if user consent has been obtained from the relevant user(s).

In block 304, a base prior region is determined for a first one of the feature portions determined in block 302. The base prior region can be a "true" prior region that is to be assumed to include a majority of pixels of the first feature portion. For example, in some implementations the first feature portion is a head portion of a human body depicted in the image. A base prior region for the head can be a portion of the head that is based on a detected face of the head portion. For example, the base prior region can be defined by an ellipse or other shaped outline (e.g., circle, polygon, irregular shape, etc., or a spatial function indicating a face boundary) that is based on detected facial landmarks of a face, e.g., eyes, nose, mouth, chin, etc. (some implementations can use other head landmarks such as hair, ears, etc.). In some implementations, the outline can be determined to have approximately a size of a head based on average dimensions of a head given the spacing of the facial landmarks. Some implementations can use other techniques to determine the base prior region of the head based on an estimated face boundary and/or head outline. For example, machine learning of head sizes can be determined given facial landmarks, as based on a large number of training images that have been manually altered with outlines indicating a head portion (or face portion) of a body. The head base prior region can be made smaller than the estimated head size so as to more likely include only head pixels. In some examples, the base prior region can be made slightly thinner and shorter that the estimated head size, for example. Some implementations can determine an outline for other types of detected features portions, e.g., based on averaged relative distances, training images, etc.

Some implementations can determine a base prior region for a head that includes other estimated portions for other connected portions of the body. For example, a base prior region that is an ellipse estimated for the head can additionally include a base prior region portion extending from the bottom of the head ellipse that is intended to include a neck area of the person. A neck of a depicted body may have similar colors as a face in the head portion, and so a neck region can be included in a head base prior region.

For example, a rectangular neck region can be extended from the bottom of a head ellipse region, where the rectangular region has a width and length based on the size of the ellipse region (e.g., based on known general or averaged dimensions for a neck portion given a particular head size). The rectangular neck region and the ellipse head region can define the base prior region for the head. In one example, a neck region can have a location based on an estimated center of the detected face, where the center of the face can be estimated based on the facial landmarks such as eyes, nose, and/or mouth. In some implementations, a neck region can have a location based on the orientation of the face. In one example, a location of the neck region can be determined as follows:

$$neck\_location\_x = center\_x - \sin(roll\_angle) * face\_ellipse\_x$$

$$neck\_location\_y = mouth\_location\_y + face\_ellipse\_y * kNeckHeightRatio$$

where the neck_location_x is the x-coordinate for the neck region (e.g., the center of the neck region), center_x is the x-coordinate of the center of the face, roll_angle is the estimated roll angle of the face, face_ellipse_x is the width of the face ellipse, neck_location_y is the y-coordinate for the neck region, mouth_location_y is the y-coordinate for a center of a mouth landmark in the face, face_ellipse_y is the height of the face ellipse, and kNeckHeightRatio is a ratio that was empirically determined to provide a neck height as a ratio of the face ellipse height.

This example provides a neck location that is based at least partially on a roll angle of the face. For example, if the face is rolled in one direction, the neck center can be located offset from the center of the face at least partially in the opposite direction to the roll direction. This can simulate the position of a person's neck if the person's head is tilted or rotated to one side, e.g., indicating that the person's body may be shifted in the opposite direction to the tilt.

Other implementations can determine a base prior region in block 304 for other body portions or other types of features, such as a body torso, an object, a landscape feature, etc. For example, other types of features may include other types of feature landmarks, such as points of a body portion that can be used to detect that body portion in an image (e.g., lengths and/or endpoints of fingers to detect a hand, position or centers of joints to detect an arm or a leg, belly button to detect a torso, etc.).

In block 306, a potential foreground prior region (e.g., potential foreground region) and a potential background prior region (e.g., potential background region) are estimated for the first feature portion. These regions can be estimated based on the base prior region determined in block 304. For example, if the first feature portion is a head portion of a body that has a base prior region of an ellipse positioned within the head, then a potential foreground region can be estimated as a region adjacent to and surrounding the base prior region by a particular amount or distance. For example, the potential foreground region can be a region that is estimated to likely overlap the border between the head region and the regions of the image outside the head, such that the potential foreground region includes the transition between these regions. In some implementations, the potential foreground region can extend around an upper head portion and can be overlapped by an extended portion of the base prior region (e.g., for a neck) as described above, such that overlapped portions of the potential foreground region are removed.

Continuing the example for a head portion, a potential background region can be estimated as a third region at least partially adjacent to and surrounding the potential foreground region by a particular amount or distance. For example, the potential background region can be a region that extends away from the potential foreground region by a particular distance. The potential background region need not cover all the areas of the image outside the potential foreground region. In some implementations, the potential background region can be overlapped by other base prior regions and potential foreground regions such that the overlapped portions of the potential background region are removed. For example, the potential background region can be overlapped by the base prior region and potential foreground region for the head as described above, as well as overlapped by a base prior region and potential foreground region for a torso portion of the body feature (described below).

In block 308, a base prior region is determined for a second feature portion, e.g., where the base prior region can be estimated based on the first feature portion. The base prior region can be a "true" prior region that is to be assumed to include a majority of pixels of a second feature. For example, in some implementations the second feature portion is at least a portion of a torso of a human body depicted in the image that is connected to a neck and head of the body. A base prior region for the torso can be based on a base prior region determined for a first feature portion that is a head portion of the human body.

For example, a base prior region for the torso can be positioned based on a location of the head portion, e.g., adjacent to the base prior region for the head. In implementations providing a neck portion to the base prior region of the head, the torso base prior portion can be joined to or overlapped by the neck portion. For example, the torso base prior region can be of a general elongated shape of a size proportional to the size of the head base prior region (or proportional to a detected face outline or face landmarks of the head). In some implementations, the torso base prior region can be made slightly thinner and shorter than an estimated torso size so that the base prior region is more likely include only torso pixels.

In some implementations, the location and/or size of the torso base prior region can be based on a location and/or an orientation of a different determined feature portion. For example, the location and/or size of a torso base prior region can be based on the detected face and/or head feature portion. In some examples, a width of the torso base prior region can be adjusted based on an estimated pan angle of the detected face (or head). For example, the larger the estimated pan angle of the face, the more narrow is the estimated torso region. This estimation can represent a torso width for a person's body that has turned in accordance with a turned face, thereby showing the side of the torso that is thinner than the front of the torso. One example of determining torso region width is shown below:

```
const float pan_angle_scale=kPanAngleWeight*faces
    [i].pan_angle( )/90.0f;

base_torso_width_ratio[i]=params_.base_torso_w-
    idth_ratio( )*(1.0f-fabs(pan_angle_scale));

potential_torso_width_ratio[i]=params_.potential_tor-
    so_width_ratio( )*(1.0f-fabs(pan_angle_scale));
``` where pan_angle_scale is the scale from the pan angle of the face which has a value in a range of [−90,90], kPanAngleWeight is an empirically determined weight, base_torso_width_ratio[i] is a ratio that can be used for the width of the base prior region for the torso based on the pan angle of the face, and potential_torso_width_ratio[i] is a ratio that can be used for the width of the torso potential prior region based on the pan angle of the face. In some implementations, one or more thresholds can be used, e.g., a pan angle above a particular threshold can cause the torso base prior region to be narrowed in width, and a pan angle below the threshold can cause no adjustment to the torso base prior region.

In some implementations, the torso base prior region can also or alternatively be located or angled within the image based on other detected feature portions, such as a neck portion described above that is an extension of the head feature portion. For example, the center of the estimated neck feature can be used as the center of the torso base prior region. In some implementations, if the neck feature portion is determined based on the roll angle of the face of the head feature portion as described above, the torso base prior region can also be based at least in part on the roll angle of the face.

Some implementations can use other techniques determine the base prior region of the torso. For example, a torso base prior region can be determined based on machine learning of torso sizes and orientations relative to head locations and sizes, as based on a large number of training images depicting heads and torsos of human bodies.

In block 310, a potential foreground prior region (e.g., potential foreground region) and a potential background prior region (e.g., potential background region) are estimated for the second feature portion. These regions can be estimated based on the base prior region for the torso as determined in block 308. For example, if the second feature portion is a torso portion of a body that has a base prior region determined as described for block 308, then a potential foreground region can be estimated as a region adjacent to and surrounding the base prior region by a particular amount or distance. For example, the potential foreground region can be a region that is estimated to likely overlap the border between the torso region and the regions of the image outside the torso, such that the potential foreground region includes the transition between these regions. In some implementations, the potential foreground region can extend around a torso portion and areas of the potential foreground region that are overlapped by the torso base prior region can be removed.

Continuing the example for a torso portion, a potential background region can be estimated as a third region at least partially adjacent to and surrounding the potential foreground region by a particular amount or distance. For example, the potential background region can be a region that extends away from the potential foreground image by a particular distance. The torso potential background region need not cover all the areas of the image outside the potential foreground region. In some implementations, the torso potential background region can be overlapped by other base prior regions and potential foreground regions such that the overlapped portions of the torso potential background region are removed.

In some implementations, additional feature portions of the feature can have prior regions determined for those feature portions, including a respective base prior region, a respective potential foreground region, and a respective potential background region. For example, some implementations can determine these prior regions for arms, legs, or other portions of a human body, and/or for portions of other types of features.

Figure 4:
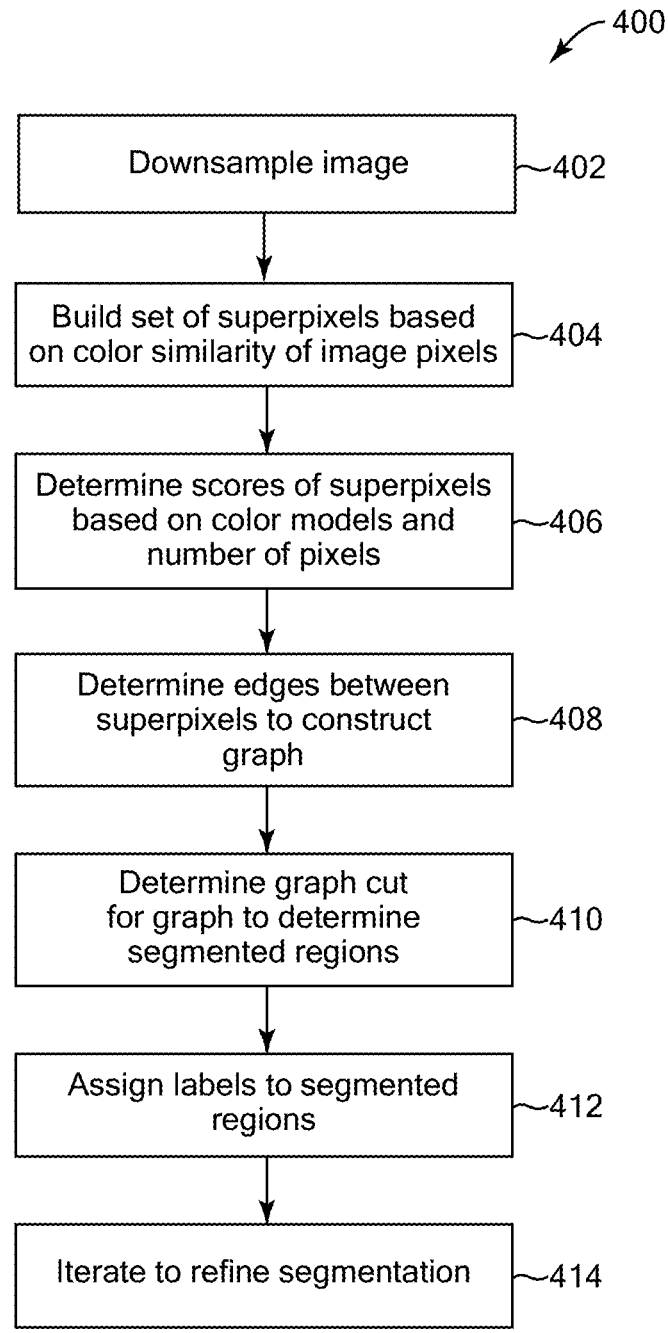
FIG. 4 is a flow diagram illustrating an example method to determine color models for regions determined in an image, according to some implementations.

FIG. 4 is a flow diagram illustrating an example method 400 to determine color models for regions determined in an image, e.g., for block 210 of FIG. 2. Other methods can alternatively be used for block 210.

In block 402, the image may be downsampled, e.g., resized to a lower pixel resolution. For example, any of well known techniques can be used to downsample the image. In some implementations, for example, the downsampling can reduce the amount of redundant information in the image which may not be needed in the mask determination.

In block 404, a set of superpixels is built based on the color similarity of pixels of the image. A superpixel, as referred to herein, is a group of adjacent pixels that have a color similarity. The group of similarly-colored pixels forms an area in the image that represents a superpixel. For example, a similarity measure can be determined between a particular pixel and each neighboring pixel, where neighboring pixels are added to the superpixel if their color is within a threshold similarity of the color of the particular pixel and there is a path of adjacent similarly-colored pixels from the neighboring pixel to the particular pixel. For example, a number of pixels neighboring a particular pixel position can be grouped into a particular superpixel. In some implementations, each superpixel may have irregular borders in a typical image captured by a camera, due to the distribution of features and colors within the image. The determined superpixels may have different sizes due to variances in color in the image. The number of superpixels may vary in each image based on the color distribution in different images. In some implementations, a bound size (e.g., maximum size or maximum number of pixels) is imposed on the formation of each superpixel. The bound size can be determined empirically, e.g., as a size that allows distinguishing of different regions in the downsampled image. In one example, if a bound size of 20×20 pixels is imposed for each superpixel, one example number of superpixels can be 768 for an image having 640×480 pixel resolution.

In some implementations, the set of superpixels is determined from all pixels of the image. Some implementations can determine the set of superpixels to include pixels from the determined prior regions described above and need not include pixels of the image from outside those prior regions. For example, in a human body feature example, superpixels can be determined from pixels in the head and torso base prior regions, in the head and torso potential foreground regions, and in the head and torso potential background regions. In some implementations, a superpixel is determined from pixels only included in regions from one feature portion, e.g., only from head regions, or only from torso regions.

Determining the set of superpixels can be performed using any of a number of techniques. In some implementations, k-means techniques can be used (may require defining a number of segments). In other examples, normalized cuts and/or other graph-based techniques can be used, gradient-ascent-based techniques can be used, and/or other techniques can be used to determine the superpixels.

In block 406, scores of the superpixels are determined, where a score of a superpixel can be based on a number of pixels from which the superpixel was determined. The superpixel can also be based on the appropriate color models as determined in block 210. For example, a superpixel score can indicate an association of the superpixel to a particular region associated with a color model used to determine the association. In one example, the score of a superpixel can be a sum of individual pixel scores for the individual pixels included in that superpixel. An individual pixel score for a pixel can indicate a likelihood that the pixel is included in the particular region in the image, e.g., a foreground region or a background region as described above with respect to FIGS. 2 and 3, as determined by the appropriate associated color model.

For example, in some implementations, two different scores are determined for each superpixel, e.g., a foreground score and a background score. The foreground score of the superpixel can be determined as a sum of individual pixel scores that are likelihoods (e.g., log-likelihoods) between the colors of the pixels and the associated foreground color model, where the associated foreground color model is either the head foreground color model or the torso foreground color model depending on the prior region in which the pixels are located. Similarly, the background score of the superpixel can be determined as a sum of individual pixel scores between the pixel colors and the associated background color model.

Here follows one example of determining a foreground score of a superpixel in a head potential foreground region for a head portion of a body feature. For each pixel of the superpixel, the log-likelihood is determined between the pixel color and the head foreground color model. The log-likelihood of each pixel with respect to the foreground Gaussian Mixture Model is the likelihood that the pixel color belongs to the foreground color distribution. For example, the pixel color is looked up in the head foreground color model to determine the likelihood, and that likelihood is converted into a log-likelihood. The log-likelihood of each pixel is summed to determine the resulting node foreground score of the superpixel. To determine the background score of the same superpixel, a sum of log-likelihood scores of the pixels is determined, where the log-likelihood scores are determined using the head background color model. In these examples, the individual pixel colors are used to determine the superpixel score instead of using a superpixel color to determine the superpixel score (e.g., where the superpixel color can be an average color of the pixels of the superpixel or other combined color). In some implementations, this can allow better capture of the color distribution of the pixels of the superpixel.

A foreground score and background score can be determined for each superpixel determined in the set of superpixels of block 404. For example, superpixels located in the torso potential foreground region or torso potential background region can be associated with scores that are determined based on the foreground and background color models determined for the torso regions described above. The result includes superpixels determined for the head and torso feature portions that each have foreground and background scores. In some implementations, superpixels located in the (foreground) base prior regions can be assigned a large value (constant value) for the foreground score and a 0 for background score, and superpixels located in background areas outside the potential background areas can be assigned a large value (constant value) for the background score and a 0 for foreground score. In some implementations, labels can be assigned to the superpixels based on the scores. For example, a "true" foreground or background label can be assigned for superpixels having a 0 as foreground or background score, respectively. A "potential" foreground or background label can be assigned to superpixels having both foreground and background non-zero scores, where a potential foreground label is assigned if the foreground score is larger, and a potential background label is assigned if the background score is larger.

In block 408, edges are determined between the superpixels determined in block 406 to construct a graph. The graph can be a data structure stored in memory or other storage device, that includes the superpixels as nodes and connects the nodes with edges based on a layout or arrangement of the superpixels with respect to each other (as indicated in the image). For example, a superpixel adjacent to four other superpixels can be connected to each of the four other superpixels by a respective edge in the graph. All adjacent superpixels can be connected by edges.

In some implementations, the graph is constructed from all the determined superpixels, e.g., including superpixels in all the prior regions of the feature portions (e.g., head and torso prior regions). In some implementations, multiple labels (e.g., more than two labels, instead of binary labels) can be used in a single graph. In other implementations, a different graph can be determined for each feature portion. For example, a head region graph and a torso region graph can be constructed, where the head region graph includes superpixels (and connecting edges) present in the head prior regions and the torso region graph includes superpixels (and connecting edges) present in the torso prior regions. In some implementations, the different graphs can be combined into a single graph.

Each edge in the graph is provided with an edge score that is based on a color similarity (e.g., color difference) between the two superpixels connected by the edge. The edge score can also be based on (e.g., weighted by) the number of pixels in the image that are shared in a common adjacency between the two superpixels connected by the edge. In some examples, the edge score can be based on the number of pixel adjacencies or connections between the two superpixels, e.g., the number of adjacent connections between individual adjacent pixels that are being replaced by a single edge between superpixels. For example, in some implementations, the edge score of an edge can be determined based on the squared color difference between the two superpixels connected by the edge, as well as the number of pixel adjacencies between the superpixels. In some examples, the color difference can be weighted by the number of pixel adjacencies. One example of determining the edge score is as follows, given an edge between two superpixels:

$$(*superpixel\_edges)[i].score = k\text{Epsilon} + k\text{Gamma}*\exp(-\text{beta}*\text{squard\_difference}[i])*(*superpixel\_edges)[i].\text{num\_pixel\_adjacencies};$$

where kEpsilon, kGamma, and beta are constants, and "squard_difference[i]" is the squared color difference between the two superpixels connected by the edge for which the edge score is being determined.

For example, to determine a color difference (or color similarity) between two superpixels, each superpixel can be assigned a determined color that is based on the colors of the individual pixels supporting that superpixel. In one example, each superpixel can have a determined color that is an average color of the pixels supporting the superpixel. The color difference between the superpixels is determined based on these superpixel colors. In this example, a squared color difference between two superpixels is weighted by the number of pixel adjacencies between the two superpixels, to determine the edge score for an edge.

Figure 5:
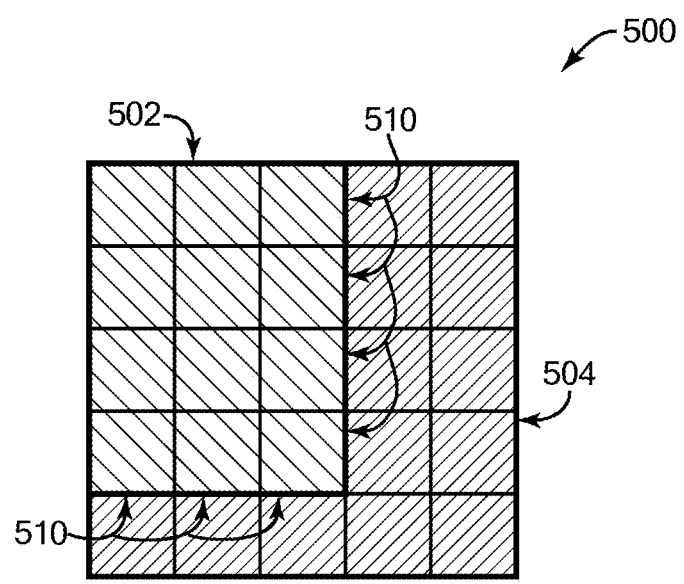
FIG. 5 is a diagrammatic illustration showing one simplified example of determining an edge weight between two superpixels.

For example, FIG. 5 is a diagrammatic illustration showing one simplified example of determining an edge weight between two superpixels. A portion 500 of an image includes a number of pixels, where some pixels are grouped into a first superpixel 502, and other pixels are grouped into a second superpixel 504. The shared pixels between the two superpixels are pixels having adjacent sides 510, and these adjacencies are numbered at seven in this example. (There are seven pixels of the second superpixel 504 adjacent to six pixels of the first superpixel 502, providing seven adjacencies). Therefore, the edge score of the edge between these two superpixels (e.g., the squared color difference between the two superpixels) is further weighted by 7 in this example.

Referring back to FIG. 4, the edge scores of all the edges of the determined graph can be determined in block 408. The graph thus includes (or is associated with) superpixel scores for the superpixels and edge scores for the edges connecting the superpixels.

In block 410, a graph cut is determined for the graph of superpixels and edges determined in block 408 to determine segmented regions. The graph cut is an optimization technique (e.g., energy minimization technique) that performs image segmentation by finding suitable cuts passing through edges in the graph (e.g., an undirected graph). The graph cut can use a standard graph cut technique, e.g., a min-cut max-flow graph cut technique. The graph cut technique finds the least cost cuts of edges based on the determined foreground and background superpixel scores and edge scores. The graph cut technique thus segments foreground and background regions based on color association and color similarity of pixels in the regions.

In this example, the graph cut operates on the graph that includes the determined superpixels as nodes and the determined edges connecting the superpixel nodes. In some implementations, the performance of a graph cut technique is affected by the number of input nodes being processed. By grouping the pixels of the image into superpixels, the number of nodes in the graph is reduced as compared to methods not using superpixels, and the performance (e.g., processing time of the graph cut) can be improved. The downsampling of the image in block 402 also reduces the number of pixels and thus can reduce the number of nodes in the graph and the processing time of the graph cut as compared to methods not performing the downsampling.

In block 412, labels may be assigned to (or updated for) the segmented regions. For example, the segmented regions can be labeled or classified as foreground regions and background regions. The labels can be based on the results of the graph cut technique that segments foreground and background regions. For example, in implementations in which labels have been previously assigned to the superpixels as described above, particular labels can be updated based on the graph cut results. In one example, updated labels are in the set of potential foreground labels and potential background labels (the "true" labels need not be updated since they are not in contention). Some implementations can assign labels for all the superpixels based on the graph cut results.

In some implementations, the labels can be based on the scores determined in blocks 406 and 408 instead of (or in addition to) the graph-cut technique of block 410. In some implementations, for example, the foreground scores and the background scores of each superpixel in a region can be combined (e.g., averaged) to a region foreground score and a region background score, and the larger of these scores can determine whether the superpixel is classified as foreground or background. Each foreground region can be considered a region depicting the desired feature or feature portion in the image. In some implementations, other determinations can be used, e.g., score thresholds determining how the labels are assigned to the regions.

The segmented regions resulting from block 410 and/or 412 can be binary regions that each indicate whether the region is a feature region or is a non-feature region (e.g., a degree or probability of being a feature having 0% or 100% and no other values). For example, the feature region can be a region depicting a human body or a portion of a human body, such as a head or a torso as described above. Other implementations can segment regions for other types of features as described above. Some implementations can indicate "true" or "potential" regions via assigned/updated labels as described above.

In block 414, particular blocks of the process can be iterated an additional number of times to refine the segmentation. For example, the color models determined in block 210 of FIG. 2 can be re-trained in each iteration with the segmented regions determined from the latest graph cut of block 410. The score determination of block 406, edge determination of block 408, graph cut technique of 410, and/or label assignment of block 412 can be performed again in each iteration based on the updated segmentation from the previous iteration. In some implementations, these blocks can be iterated until convergence (e.g., no further reduction in energy from the graph cut technique). In some implementations, a predefined number of iterations can be performed, e.g., three iterations, or a different number of iterations.

In some implementations, instead of determining a graph from the determined superpixels as described above, a graph can first be created using individual pixels of the image as nodes. For example, the graph can include pixels as nodes and provides an edge between each pixel and each pixel neighboring to that pixel in the image (e.g., over the entire image or for pixels in a region of the image). Such a pixel-level graph can be adjusted to include superpixels as nodes, where the superpixels are determined as described above. The edges can be adjusted to connect the superpixels as described above.

Some implementations can use other or additional foreground and background segmentation techniques to determine foreground regions (e.g., feature regions) and background regions (e.g., non-feature regions) in the image. For example, some techniques can use depth information that is associated with the image, where the depth information indicates a distance of each pixel in the image from a depth-enabled camera that captured the image. Such information can be used to determine foreground pixels and background pixels, e.g., where background pixels are a further distance from the camera, e.g., pixels greater than a threshold distance, or a cluster of pixels at a greater distance than other pixels. Other techniques can also be used to determine foreground and background pixels. For example, if the image is a frame in a video sequence of multiple image frames, then multiple frames can be examined to estimate foreground regions (e.g., that may move between frames) and background regions (e.g., that may stay static) in the image.

Figure 6:
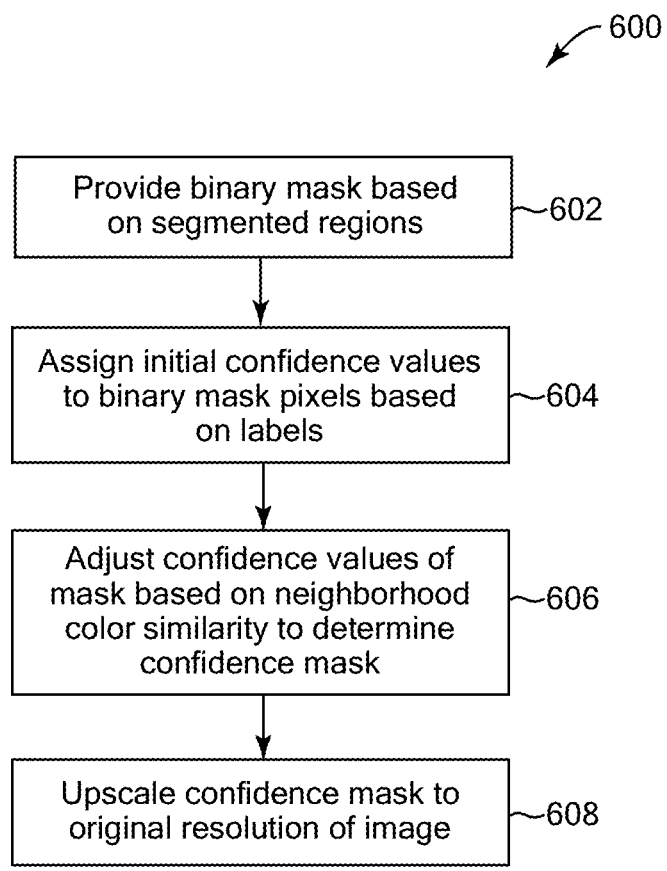
FIG. 6 is a flow diagram illustrating an example method to determine a feature mask based on segmented regions, according to some implementations.

FIG. 6 is a flow diagram illustrating an example method 600 to determine a feature mask based on the segmented regions, e.g., for block 214 of FIG. 2. Other methods can alternatively be used for block 214.

In block 602, a binary mask is provided based on the segmented regions of the image, e.g., resulting from block 212 of FIG. 2. In various examples, the binary mask may have been created in and provided from block 212, or can be created in block 602. The binary mask can be a mask image having the same resolution as the image (e.g., that may have been downsampled as described above for block 402). The binary mask can include mask pixels having a first mask value indicating that those pixels are part of segmented foreground regions (feature regions), and the binary mask can include mask pixels having a different, second mask value indicating that those pixels are part of segmented background regions (non-feature regions).

In block 604, initial confidence values are assigned to the mask pixels. For example, the initial confidence values can be based on the assigned labels described above. In one example, after the graph cut of block 410, each pixel with "true head" or "true torso" label (as determined from the superpixel of which the pixel is a part) can be assigned an initial confidence value of 1.0, and each pixel with a "true background" label can be assigned an initial confidence value of 0. Pixels having a "potential" label (foreground or background) can be assigned an initial confidence value of 0.75. Different initial confidence values can be assigned in other implementations. For example, pixels with "potential" labels can be assigned an initial value anywhere from 0 to 1, depending on the application. In one example, if the initial confidence value is set to 0, the resulting confidence mask (described below) can have a high foreground accuracy, where pixels with the foreground label most likely correspond to real foreground regions, but can be less likely to describe the exact boundary between foreground (feature) regions and background regions.

In block 606, the confidence values of the mask are adjusted based on color similarity of the pixels to neighboring pixels to determine a confidence mask. In some implementations, a bilateral filter can be applied to the initial confidence mask values. For example, a joint bilateral filter can be used to adjust the initial mask values by color similarity of the corresponding image pixels to neighboring image pixels. The resulting confidence mask can be a pixel map that indicates, at each of a plurality of pixels of the corresponding image, an associated confidence (e.g., confidence value or level) that the corresponding image pixel is a feature pixel. The resulting confidence mask is a "soft" mask having mask values from a continuous range of values rather than from two values as used for the "hard" binary mask. For example, a mask pixel can be assigned a higher confidence value if it is more likely to indicate a feature pixel that is part of a feature region, as determined based on its binary mask region and neighboring pixel colors in the image. In some examples, a pixel can be in the middle of an area and surrounded by neighboring pixels having similar colors, and can be assigned a higher confidence value than a pixel near a border between a foreground region and a background region where some of the neighboring pixels may have different colors. Since that pixel is near the edge of a region, it may be a feature pixel or a non-feature pixel and so is assigned less confidence to be a feature pixel.

In block 608, the confidence mask is upscaled to the original resolution of the image. For example, the graph cut technique applied in block 410 described above can be applied to a downsampled image in some implementations, and the confidence mask is at this same downsampled resolution. To provide mask pixels that correspond 1:1 to the pixels in the original image, the confidence mask can be upsampled to the original image resolution. For example, in some implementations the upsampling can use joint bilateral upsampling to upsample the confidence mask. Other upsampling techniques can be used in some implementations. Some implementations can upsample the confidence mask to a different image resolution than the original image resolution (e.g., where there is a 1:n correspondence between mask pixels and image pixels), or some implementations can omit the upsampling.

In various implementations, the confidence mask can include mask pixels for all the pixels of the image, or for a portion of the pixels of the image, e.g., for one or more areas of the image less than the entire area of the image. Some implementations can apply a transformation to the confidence mask to scale the confidence values of the confidence mask to a desired range of values. For example, the confidence mask values can be enforced to be between 0 and 255 in some implementations, or other ranges in other implementations.

Various blocks and operations of methods 200-400 and/or 600 can be performed in a different order than shown and/or at least partially simultaneously, where appropriate. For example, some implementations can perform blocks of the methods at various times and/or based on events not related to modifying an image or providing an image for display. In some implementations, blocks can occur multiple times, in a different order, and/or at different times or stages in the methods. One or more blocks can be divided into multiple blocks in various implementations.

In some implementations, the methods of FIGS. 2-4 and 6 can be implemented, for example, on a server system (e.g., server system 102 shown in FIG. 1). In some implementations, one or more client devices (e.g., client devices shown in FIG. 1) can perform one or more blocks instead of or in addition to a server system performing those blocks. For example, images can be stored on a client device and one or more color models, graphs, and/or masks can be determined and/or stored on a server device, or vice versa.

Figure 7:
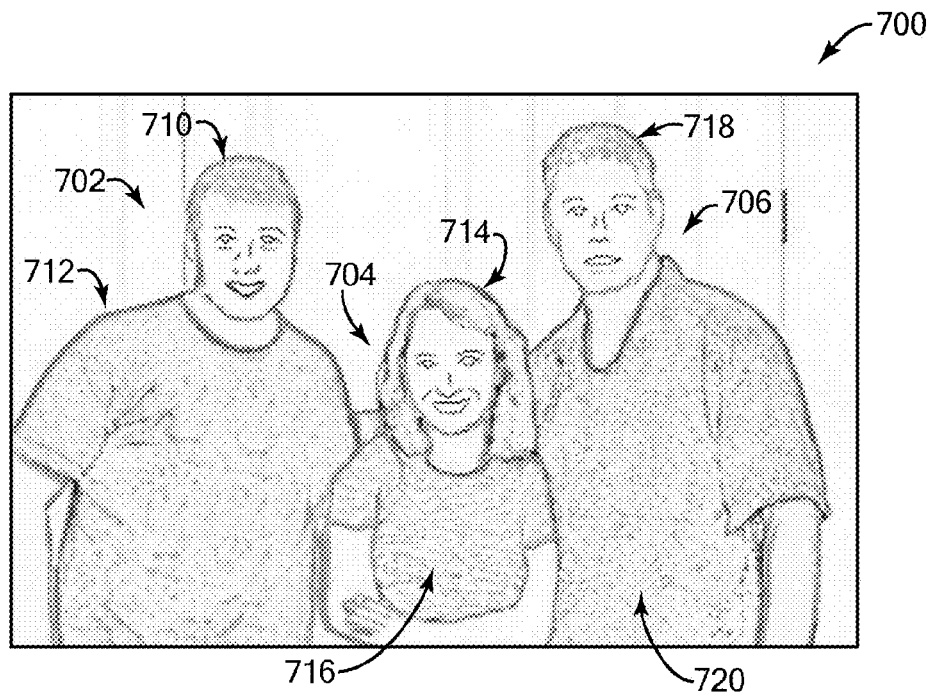
FIG. 7 is a diagrammatic illustration of an example original image.
Figure 8:
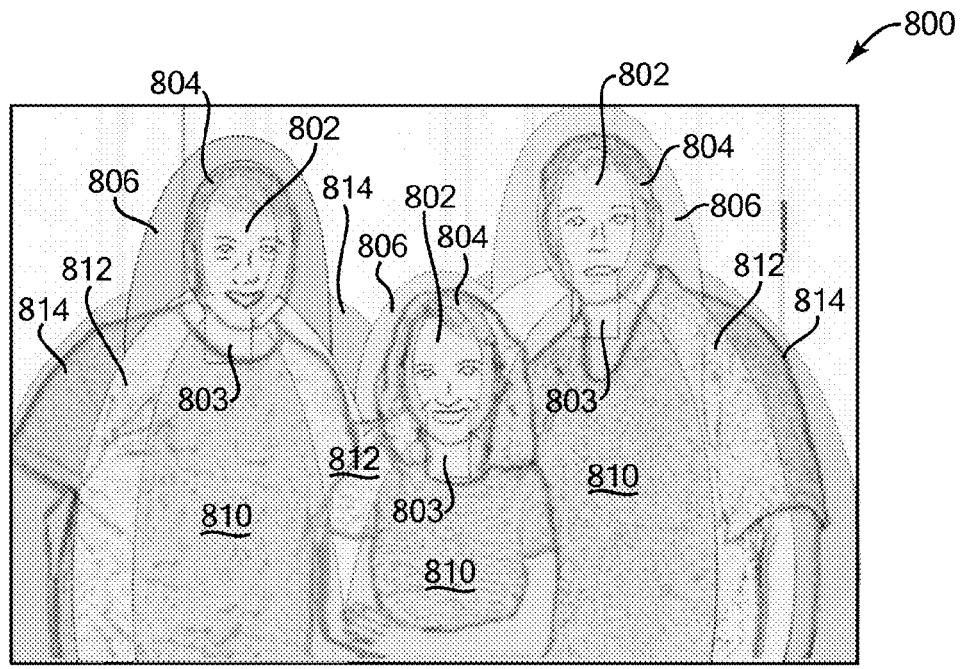
FIG. 8 is a diagrammatic illustration of an example image including prior regions that have been determined for detected features in the example image of FIG. 7.
Figure 9:
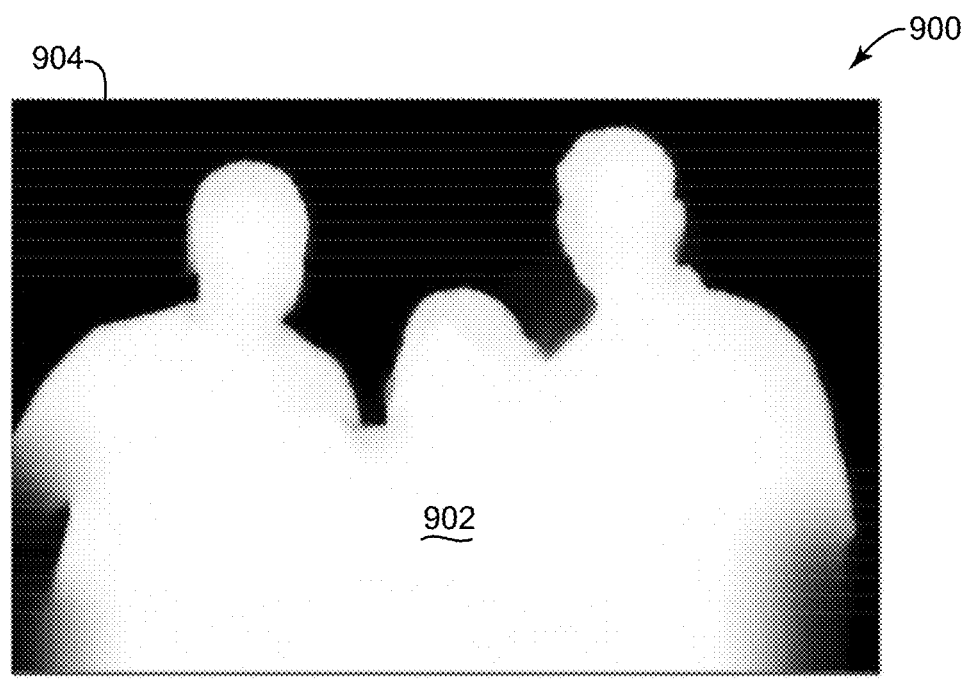
FIG. 9 is a diagrammatic illustration of an example confidence mask determined based on the image and prior regions shown in FIGS. 7 and 8.

FIGS. 7-9 are diagrammatic illustrations related to examples of determining a feature mask for a desired feature of at least a portion of a human body depicted in an image, using one or more features described herein. These figures show drawings of human bodies that represent images having pixels, e.g., digital photographs originally captured by a camera or similar types of images. In some implementations, the images shown in FIGS. 7-9 can be displayed in a user interface that in turn can be displayed on a display device, e.g., of a client device 120, 122, 124, and/or 126 of FIG. 1, or a server system 102 in some implementations. In some implementations, images can be processed as described herein and displayed in other types of user interfaces, one or more screens of an application program, or other visual output of a display device. In other implementations, images can be processed as described herein without being displayed, or can be displayed in other ways.

FIG. 7 shows an example original image 700 which can be obtained for processing as described above and for which a feature mask is desired. Image 700 can be an image captured by a camera, in some implementations. The image depicts three human bodies 702, 704, and 706 to be masked, where body 702 includes a head portion 710 and a torso portion 712 below the head portion 710, body 704 includes a head portion 714 and a body portion 716 below the head portion 714, and body 706 includes a head portion 718 and a torso portion 720 below the head portion 718.

FIG. 8 shows the example image 700 including prior regions that have been determined for detected features in the image, e.g., as described for block 208 of FIG. 2. In this example, faces of the bodies 702, 704, and 706 have been detected using one or more facial recognition techniques. For example, one or more facial recognition techniques can be used to detect a face by detecting facial landmarks in an image, including eyes, eyebrows, nose, mouth, etc. In some examples, facial landmark points that indicate the boundaries of detected facial landmarks can be determined by a facial recognition technique, e.g., points indicating the boundaries of the landmark areas. Other facial landmarks can be determined using facial recognition techniques or implementations.

From the detected faces, a head region can be estimated, e.g., as an ellipse having a size based on the position and spacing of the facial landmarks. The prior regions for the head can be estimated based on the estimated head region. For example, based on the three detected faces and estimated head regions, a head base prior region 802 is estimated for each head portion 710, 714, and 718. In this example, the base prior region 802 is defined to be smaller than the border to estimated head region so that it is more likely that the base prior region 802 includes all or almost all pixels depicting the head.

In this example, each base prior region 802 also includes an extended region portion 803 that extends out the bottom of the ellipse portion of the head, to cover a neck area of the detected body. For example, the extended portions can have dimensions that are based on the size (e.g., dimensions) of the respective ellipses used for the associated head portions, as described above.

A head potential foreground region 804 is also determined for each head portion 710, 714, and 718, and indicates an additional region that, when combined with the associated base prior region 802, approximately defines the head portion of the associated body. Each head potential foreground region 804 is determined based on its associated base prior region 802. For example, each foreground region 804 is positioned to surround its associated base prior region 802 and can extend in directions away from the center of the face, approximately to the estimated border of the head. In some implementations, the foreground region 804 can extend a small distance past the estimated border of the head region.

A head potential background region 806 is also determined for each head portion 710, 714, and 718. The potential background region 806 defines an approximate region including background pixels, e.g., non-head pixels. In this example, the head potential background region 806 is defined to include non-body pixels (e.g., non-feature pixels), and it does not extend into the image areas covered by the torso base prior region and the torso potential foreground region described below. Each head potential background region 806 is determined based on its associated head potential foreground region 804. For example, each head background region 806 is positioned to surround its associated head foreground region 804 and can extend a particular (e.g., predetermined) distance away from the center of the face. For example, the head background region 806 can be made large enough to include a sufficient number of pixels to provide a color model of desired accuracy.

A torso base prior region 810 can be determined for each torso 712, 716, and 720 of each body 702, 704, and 706, respectively. In this example, the torso base prior regions 810 for the three bodies overlap each other and are combined into a single torso base prior region for the image. The torso base prior region 810 can be based on an estimated torso region that is assumed to be positioned adjacent to the head region determined previously. For example, the estimated torso region can be a particular length and width based on the size of the head region and have a location based on a extended neck region portion 803. The torso base region 810 can be a smaller area centered within that estimated torso region such that it is more likely to include all or mostly torso pixels. As described above, the torso region can be adjusted in width based on a pan angle of the head or face. In this example, the faces and heads of the three depicted persons are approximately fully facing the camera that captured the image and no adjustment is made to the torso regions.

A torso potential foreground region 812 can also be determined for each torso portion 712, 716, and 720 based on the torso base prior region 810. Each torso potential foreground region 812 indicates an additional region that, when combined with the associated torso base prior region 810, approximately defines the torso portion of the associated body feature. For example, the torso foreground regions 812 can be regions surrounding the associated torso base prior regions 810. In some examples, each foreground region 812 is positioned to surround its associated base prior region 810 and can extend in directions away from the center of the torso, approximately to the border of the estimated torso. In some implementations, the foreground region 812 can extend a small distance past the border of the estimated torso. The torso foreground regions 812 can be overlapped by the prior regions of the head portion.

A torso potential background region 814 is also determined for each torso portion 712, 716, and 720. The torso potential background region 814 defines an approximate region including background pixels, e.g., non-torso pixels. In some implementations, portions of torso background regions 814 that overlap other regions can be removed, e.g., other regions can be given priority. In some implementations (not shown), the torso potential background regions 814 can be joined with any overlapping or adjacent head potential background regions 806, resulting in a body background region. Each torso potential background region 814 is based on its associated torso potential foreground region 812. For example, each torso background region 814 is positioned to surround its associated torso foreground region 812 and can extend a particular (e.g., predetermined) distance away from the center of the torso. For example, the torso background region 814 can be made large enough to include a sufficient number of pixels to provide a color model of desired accuracy.

In the example of FIGS. 7 and 8, no additional body portions are determined to be present. For example, the torso estimates can extend up to the bottom border of the image, indicating no further body portions are detected. Furthermore, this example includes arm portions in the torso regions. In other examples, additional body portions may be present or independently evaluated, and prior regions for those body portions can be determined similarly as explained above for head and/or torso body portions, and/or using other techniques (e.g., body pose or skeleton detection techniques, etc.)

FIG. 9 shows an example of a confidence mask 900 determined based on the image 700 and prior regions shown in FIGS. 7 and 8. The prior regions of FIG. 8 can be used to determine foreground and background color models for the head region and the torso region similarly as described above with reference to block 210 of FIG. 2. Segmented regions can then be determined based on the prior regions and the color models as described for block 212 of FIG. 2. For example, as described above, the image 700 can be downsampled, superpixels can be determined for the pixels of the downsampled image, edges can be determined between superpixels to construct a graph, a graph cut technique can be applied to the graph to determine segmented regions for foreground and background, and a binary mask can be determined based on the segmented regions. In this example, the segmented regions of the binary mask include a foreground region (e.g., feature region) including head regions and torso regions of all three of the body features depicted in the image, and a background region (e.g., non-feature region) including the non-body (e.g., non-head and non-torso) regions outside of the foreground region.

The determined binary mask can be similar to confidence mask 900 except having only two values, represented as white (for mask feature pixels indicating a feature region) and black (for mask non-feature pixels indicating a non-feature region). The confidence mask 900 can be determined from the binary mask. For example, as described with reference to FIG. 6, the binary mask can be assigned initial confidence values, and those initial confidence values can be adjusted based on color similarity to determine the confidence values of the confidence mask 900. The confidence mask can be upscaled to the resolution of the image 700.

Confidence mask 900 includes a foreground region 902 (e.g., feature region) and a background region 904 (e.g., non-feature region). For example, white pixels in confidence mask 900 can indicate a 100% (or close to 100%) confidence that the pixel is a foreground (feature) pixel, and the black pixels can indicate a 0% (or close to 0%) confidence that the pixel is a foreground pixel, e.g., indicating that the pixel is a background (non-feature) pixel. Edges of the feature region 902 can include gray pixels of various shades that indicate less confidence that the pixels at those edges are feature pixels. For example, a transition from white pixels in the foreground region 902 to the black background region 904 indicates (in this example) a gradient or gradual change in confidence or probabilities from the inside of the foreground region 902 to the background region 904 external to the foreground region 902.

Various implementations and applications can use one or more image features described herein. For example, masks for features such as human bodies depicted in an image can be determined using one or more described aspects or features, allowing modification to the image based on such features.

Feature masks as described herein can be used to apply modifications to features appearing in multiple frames in video content. In some video applications, a feature found in one frame can be tracked and assumed to be the same in multiple successive frames, e.g., using optical flow and/or other techniques to estimate how particular pixels move between frames. Segmented regions (e.g., foreground and background regions) determined for one frame can be shifted in position as needed for successive frames and used without having to determine new regions and masks from the beginning of the process.

In some implementations, image features can be detected other than body features described in the examples above, and feature masks can be determined similarly using one or more features as described above. For example, image recognition techniques that can detect animals, monuments, objects, landscape features, or other features in images can be used to estimate prior regions for base regions, potential foreground regions, and potential background regions similarly as described above, e.g., based on recognized or detected image characteristics (with user consent). In some examples, prior regions can be determined relative to the detected features and feature portions, and color models determined for those prior regions. Segmented regions can be determined based on the color models and techniques such as graph cuts as described above. A resulting confidence mask can be determined based on the segmented regions, similarly as described above.

Figure 10:
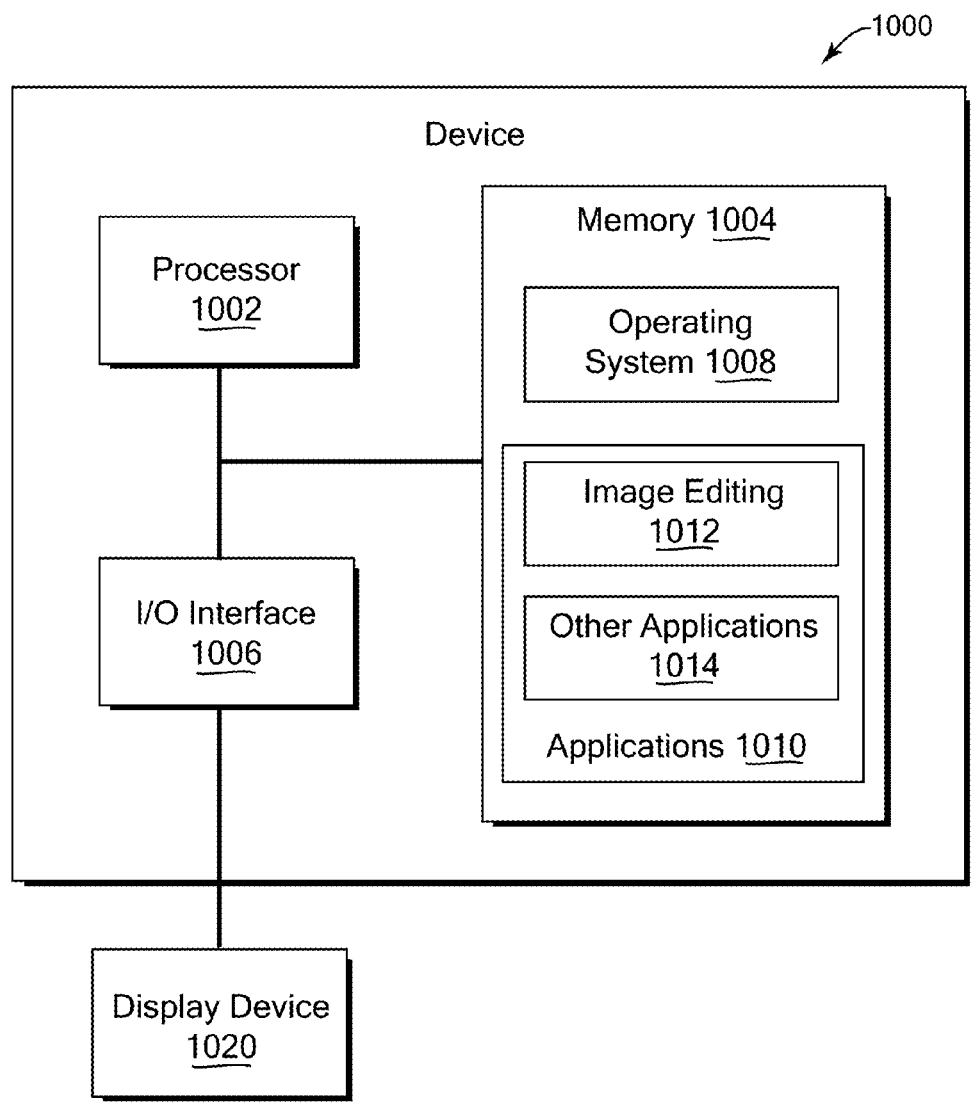
FIG. 10 is a block diagram of an example device which may be used for one or more implementations described herein.

FIG. 10 is a block diagram of an example device 1000 which may be used to implement one or more features described herein. In one example, device 1000 may be used to implement computer device used to implement a server device, e.g., server device 104 of FIG. 1, and perform appropriate method implementations described herein. Device 1000 can be any suitable computer system, server, or other electronic or hardware device. For example, the device 1000 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1000 includes a processor 1002, a memory 1004, and input/output (I/O) interface 1006.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008 and one or more applications 1010, e.g., a graphics editing engine, web hosting engine, social networking engine, etc. In some implementations, applications 1010 can include instructions that enable processor 1002 to perform the functions described herein, e.g., some or all of the methods of FIGS. 2-4 and 6. For example, applications 1010 can include one or more image editing applications 1012, including an image editing program to receive user input, select input images, receive user input to cause determination of a mask for an image, modify pixels of images (e.g., by applying edit operations to an input image using a determined feature mask), and provide output data causing display of original and modified images on a display device of the device 1000. An image editing program, for example, can provide a displayed user interface responsive to user input to display selectable options/controls and images based on selected options. Other applications or engines 1014 can also or alternatively be included in applications 1010, e.g., media display applications, communication applications, web hosting engine or application, social networking engine or application, etc. Any of software in memory 1004 can alternatively be stored on any other suitable storage location or computer-readable medium. In addition, memory 1004 (and/or other connected storage device(s)) can store images (e.g., input images, feature masks, etc.), feature landmark points and shapes, color model information, graph cut information, parameters and factors, user preferences, and other instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the server device 1000 with other systems and devices. For example, network communication devices, storage devices (e.g., memory and/or database 106), and input/output devices can communicate via interface 1006. In some implementations, the I/O interface can connect to interface devices including input devices (keyboard, pointing device, touchscreen, microphone, camera, scanner, etc.) and/or output devices (display device, speaker devices, printer, motor, etc.). Display device 1020 is one example of an output device that can be used to display content, e.g., one or more images provided in an image editing interface or other output application as described herein. Display device 1020 can be connected to device 1000 via local connections (e.g., display bus) and/or via networked connections and can be any suitable display device, some examples of which are described below.

For ease of illustration, FIG. 10 shows one block for each of processor 1002, memory 1004, I/O interface 1006, and software blocks 1008 and 1010. These blocks may represent one or more processors or processing circuitries, operating systems, memories, I/O interfaces, applications, and/or software modules. In other implementations, device 1000 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 1000, e.g., processor(s) 1002, memory 1004, and I/O interface 1006. An operating system, software and applications suitable for the client device can be provided in memory and used by the processor, e.g., image editing software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 1020, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods of FIGS. 2-4 and 6) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users are provided with one or more opportunities as described above to control whether programs or features collect user information (e.g., information about a user's social network, user characteristics (age, gender, profession, etc.), social actions or activities, a user's preferences, content created or submitted by a user, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user has control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to determine a feature mask for an image, the method comprising:
   estimating one or more prior regions in the image, wherein the one or more prior regions approximately define a feature in the image;
   determining a plurality of superpixels, wherein each superpixel is based on multiple pixels of the image that are similar in color;
   constructing a graph, wherein each node of the graph corresponds to a superpixel of the plurality of superpixels;
   determining a superpixel score associated with each of the plurality of superpixels, wherein the superpixel score is based at least on a number of pixels from which the associated superpixel is determined;
   determining one or more segmented regions in the image based on applying a graph cut technique to the graph based at least on the superpixel scores;
   determining the feature mask based on the one or more segmented regions, wherein the feature mask indicates a degree to which each of a plurality of pixels of the image depict the feature; and
   modifying the image based on the feature mask.

2. The method of claim 1, further comprising:
   downsampling the image before determining the one or more segmented regions.

3. The method of claim 2, further comprising:
   upsampling the feature mask to an original pixel resolution of the image before modifying the image.

4. The method of claim 1, wherein the nodes of the graph are connected to each other by edges in the graph, and further comprising determining a respective edge score associated with each edge in the graph, wherein each edge score is based at least in part on a number of adjacencies of pixels between superpixels connected by the edge.

5. The method of claim 4 wherein each superpixel has a color that is an average of the colors of the pixels from which the superpixel is determined, and wherein each edge score is based on a color difference between the superpixels connected by the associated edge, wherein the color difference is weighted by the number of adjacencies of pixels between the connected superpixels.

6. The method of claim 1, wherein determining the superpixel score associated with each superpixel includes:
   determining a respective likelihood between a color of each pixel of the superpixel and a color model determined for the feature; and
   summing the likelihoods.

7. The method of claim 1, wherein the one or more segmented regions are one or more binary mask regions indicating that corresponding pixels of the image are feature pixels, and further comprising determining confidence mask regions for the feature mask based on the one or more binary mask regions using a joint bilateral filter, wherein each confidence mask pixel indicates the degree to which at least one corresponding pixel of the image depicts the feature using confidence values from a continuous range of values.

8. The method of claim 1, further comprising determining a plurality of color models including at least one foreground color model and at least one background color model based on the one or more prior regions, wherein determining a superpixel score includes:
   determining a foreground score indicating association of the associated superpixel to a foreground region based on the at least one foreground color model, and
   determining a background score indicating association of the associated superpixel to a background region based on the at least one background color model.

9. The method of claim 1, wherein the one or more prior regions are a plurality of prior regions, wherein each of the plurality of prior regions defines a different portion of the feature in the image, and wherein a respective color model is determined for each different portion.

10. The method of claim 1, wherein the feature includes a human body, and wherein the one or more prior regions are a plurality of prior regions including a head prior region and a torso prior region,
    wherein estimating the head prior region includes determining a head feature portion based on detecting a face in the image, and
    wherein estimating the torso prior region is based on a location of the head feature portion and an orientation of the head feature portion.

11. The method of claim 10, wherein estimating the torso prior region includes estimating a width of the torso prior region based on a pan angle of the detected face.

12. A system to determine a mask for at least a portion of a human body depicted in an image, the system comprising:
    a storage device; and
    at least one processor operative to access the storage device and configured to:
    estimate a head prior region in the image, wherein the head prior region defines a head feature portion in the image;
    estimate a torso prior region in the image based on a location of the head feature portion and at least one orientation of the head feature portion;
    determine one or more segmented regions based on the head prior region and the torso prior region;
    determine a human body mask based on the one or more segmented regions, wherein the human body mask indicates a degree to which each of a plurality of pixels of the image depict the at least a portion of the human body; and
    modify one or more pixels in the image using the human body mask.

13. The system of claim 12, wherein the at least one processor is further configured to determine a plurality of color models that include at least one foreground color model and at least one background color model based on the head prior region and the torso prior region, wherein the at least one processor is configured to determine the one or more segmented regions by:

determining a foreground association of the plurality of pixels to a foreground region based on the at least one foreground color model, and determining a background association of the plurality of pixels to a background region based on the at least one background color model.

14. The system of claim 12 wherein the at least one processor is configured to determine the one or more segmented regions by:

determining a plurality of superpixels, wherein each superpixel is based on multiple pixels of the image that are similar in color;

determining a superpixel score associated with each superpixel based on a number of pixels in the superpixel; and applying a graph cut technique utilizing the plurality of superpixels as nodes for a graph used by the graph cut technique.

15. The system of claim 12 wherein the at least one processor is configured to:

estimate the head prior region by determining the head feature portion based on detecting a face in the image; and estimate the torso prior region based on at least one of:
a pan angle of the detected face; and
a roll angle of the detected face.

16. A non-transitory computer readable medium having stored thereon software instructions to determine a mask for an image that, when executed by a processor, cause the processor to perform operations including:

estimating a plurality of prior regions in the image, wherein each of the plurality of prior regions defines a portion of a feature in the image;

determining a plurality of color models including a foreground color model and a background color model respectively based on an associated one of the prior regions;

determining one or more segmented regions in the image including determining a foreground association of a plurality of pixels to a foreground region based on the associated foreground color model, and determining a background association of the plurality of pixels to a background region based on the associated background color model;

determining a feature mask based on the one or more segmented regions, wherein the feature mask indicates a degree to which each of a plurality of pixels of the image depict the feature; and modifying one or more pixels in the image using the feature mask.

17. The non-transitory computer readable medium of claim 16 wherein the portions of the feature include a head portion and a torso portion, and wherein the operation of estimating a plurality of prior regions includes estimating a head prior region and a torso prior region, wherein estimating the torso prior region is based at least in part on a location of the head portion and an orientation of the head portion.

18. The non-transitory computer readable medium of claim 16 wherein the determining the one or more segmented regions includes:

determining a plurality of superpixels, wherein each superpixel is based on multiple pixels of the image that are similar in color;

determining a superpixel score associated with each superpixel based on a number of pixels in the associated superpixel;

determining a graph including the plurality of superpixels as nodes and including a plurality of edges connecting the plurality of superpixels, wherein each edge is associated with a respective edge score based on a number of adjacencies of pixels between superpixels connected by the edge; and applying a graph cut technique that partitions the graph based on the superpixel scores and the edge scores.

19. The non-transitory computer readable medium of claim 16 wherein the operations further include:

downsampling the image before the operation of determining the one or more segmented regions; and upsampling the feature mask to an original pixel resolution of the image before modifying one or more pixels in the image.

20. The non-transitory computer readable medium of claim 16 wherein the operation of determining the one or more segmented regions includes:

determining each pixel of the image as a feature pixel or a non-feature pixel based on the association with the foreground region and the association with the background region; and applying a joint bilateral filter to the mask based on color similarity of corresponding image pixels to obtain the feature mask, wherein each mask pixel of the feature mask is indicative of a confidence level that a corresponding pixel of the image depicts the feature.

* * * * *